Sept. 30, 1924.  1,510,336
J. F. O'CONNOR
FRICTION SHOCK ABSORBING MECHANISM
Filed Nov. 11, 1921
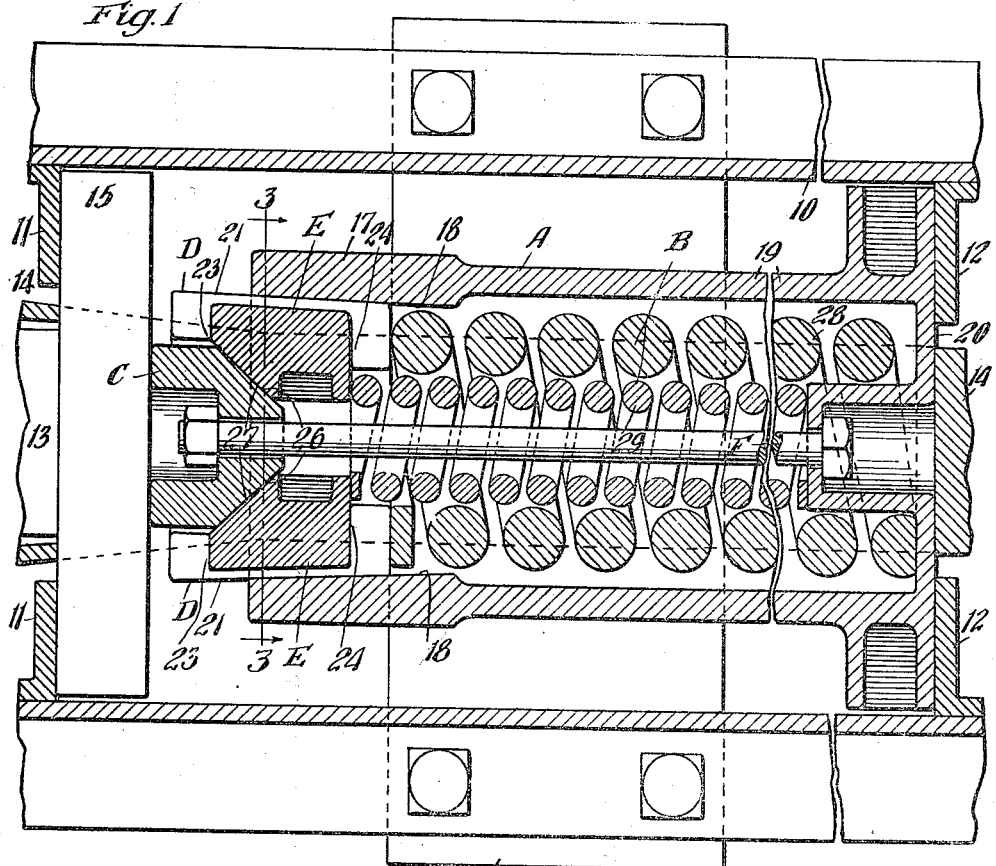
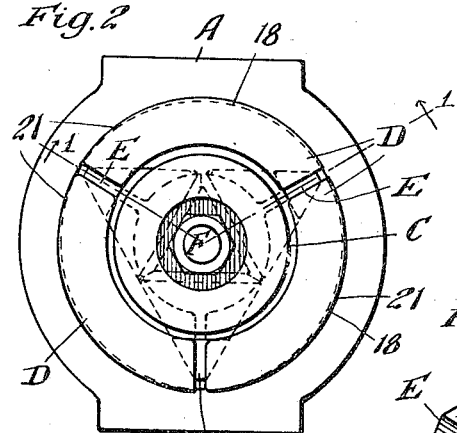
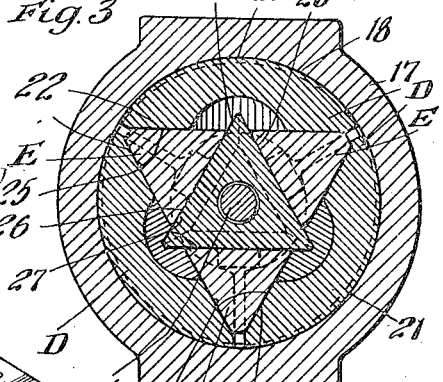
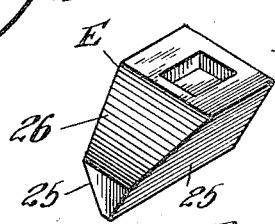
Inventor
John F. O'Connor
By Geo. I. Haight his Atty.

Patented Sept. 30, 1924.

1,510,336

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 11, 1922. Serial No. 600,229.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein is obtained high capacity and a smooth graduated action.

A specific object of the invention is to provide a mechanism of the character indicated in the preceding paragraph and wherein the friction system is so formed as to produce the spreading action by a combination of radially and laterally directed wedge faces.

In the drawing forming a part of this specification, Figure 1 is a horizontal longitudinal sectional view of a portion of a railway draft rigging showing my improvements in connection therewith, the section through the friction elements proper, however, being taken on the line 1—1 of Figure 2 and corresponding to two intersecting planes at 120° to each other. Figure 2 is a front end elevation of the shock absorbing mechanism proper. Figure 3 is a vertical transverse sectional view of the shock absorbing mechanism proper corresponding to the line 3—3 of Figure 1. And Figure 4 is a detail perspective of one of the secondary wedge elements.

In said drawing, 10—10 denote channel draft sills of a car underframe, to the inner faces of which are secured front stop lugs 11 and rear stop lugs 12. A portion of a drawbar is indicated at 13, with which is operatively associated a hooded cast yoke 14, the latter having disposed therewithin the shock absorbing mechanism proper, hereinafter described, and a front follower 15. The yoke and parts therewithin are supported in operative position by a detachable saddle plate 16.

The improved shock absorbing mechanism proper, as shown, comprises a combined friction shell and spring cage casting A; a spring resistance B; a pressure-transmitting wedge block C; three friction shoes D—D arranged in a circular series; three secondary wedge elements E—E; and a retainer bolt F.

The casting A, as shown, is of generally cylindrical form having a friction shell proper 17 at its outer end, the latter being provided with interior cylindrical friction surfaces 18 arranged symmetrically with respect to the axis of the shell. Rearwardly of the shell 17 proper, the casting A is formed with a spring cage 19 and at its rear end with an integral vertical wall 20, the latter being suitably laterally extended and reinforced to adapt it to function as the rear follower of the mechanism.

The shoes D, three in number, are of like construction, each having an outer true cylindrical friction surface 21 cooperable with a shell friction surface 18. Each shoe D is further provided with longitudinally extending wedge-faced edges 22—22. The wedge faces 22 of two adjacent edges of two shoes D converge radially outwardly of the shell with an included angle therebetween of approximately 60°. The said wedge faces 22 are disposed intermediate the ends of each shoe, the shoes having outer and inner inwardly extending shoulders 23 and 24 at the ends of said wedge faces 22, between which are centered the respective secondary wedge elements E.

The wedge elements E are three in number and each is of triangular cross section as shown in Figure 3. Each member E has a pair of wedge faces 25—25 converging radially outwardly of the shell, each wedge face 25 cooperating with a shoe-wedge face 22 in such manner as to tend to separate the shoes D circumferentially. Near its outer end, each secondary wedge E has a blunt angle wedge face 26, the latter converging inwardly of the shell, as clearly shown in Figure 1. The blunt angle wedge faces 26 are arranged to cooperate with corresponding blunt angle wedge faces 27 formed on the pressure-transmitting wedge block C.

The spring B is preferably in the form of two coils, an outer heavy coil 28 which bears upon the inner ends of the shoes D and an inner lighter coil 29 which bears, at its front end, on the inwardly projecting portions of the secondary wedges E, as shown in Figure 1.

The retainer bolt F is anchored at its rear end within a hollow boss formed integral with the casting A and at its forward end within a suitable recess provided in the wedge block C.

The operation of the device, assuming a compression stroke under buff, is as follows. As the front follower 15 is moved inwardly the wedge block C is forced to move in unison therewith, thus setting up a spreading action radially upon the secondary wedges E. On account of the manner in which the latter are seated within the shoes D, it is evident that the shoes D will be forced to travel longitudinally with the secondary wedges E and as the shoes move inwardly of the tapered shell, a heavy wedging action in a circumferential direction is produced upon the shoes D on account of the arrangement which is best illustrated in Figure 3. Due to the taper of the shell, it is evident that the shoes D must move laterally slightly toward each other, thus further increasing the pressure between the shoes and the shell. Such inward or differential movement of the shoes D is automatically compensated for by slippage of the secondary wedges E upon the pressure-transmitting wedge block C so that the secondary wedges E and shoes D will advance at a slightly faster rate than the wedge block C during a compression stroke. Upon removal of the actuating force, the wedge block C will readily disengage itself from the secondary wedges E on account of the blunt angle which the cooperating faces 26 and 27 make with respect to the axis of the gear. This immediately allows the secondary wedges E and shoes D to collapse and to be thereafter projected outwardly by the spring until all the parts assume their normal full release position.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having friction surfaces on the interior thereof; of a spring resistance; friction shoes cooperable with the shell and having radially outwardly converged, longitudinally extending wedge faces; a pressure-transmitting wedge block; secondary wedges cooperable with said wedge block and provided also with radially outwardly converging wedge faces cooperable with said wedge faces of the shoes; and means for preventing relative movement of said secondary wedges and shoes longitudinally of the mechanism.

2. In a friction shock absorbing mechanism, the combination with a friction shell having friction surfaces on the interior thereof; of a spring resistance; friction shoes cooperable with the shell and having radially outwardly converged, longitudinally extending wedge faces; a pressure-transmitting wedge block; and secondary wedges cooperable with said wedge block and provided also with radially outwardly converged wedge faces cooperable with said wedge faces of the shoes, said secondary wedges being seated in recesses provided on the shoes so arranged that the secondary wedges and shoes travel in unison lengthwise of the shell.

3. In a friction shock absorbing mechanism, the combination with a friction shell having cylindric friction surfaces on the interior thereof converged inwardly of the shell; of a spring resistance; a plurality of friction shoes arranged in a circular series cooperable with the shell and having radially outwardly converged longitudinally extending wedge faces; a pressure-transmitting block having blunt angle wedge faces on the inner end thereof; and a plurality of secondary wedges carried by said shoes and movable bodily therewith longitudinally of the mechanism, said wedges cooperating with said wedge block and provided also with radially outwardly converged wedge faces cooperable with said wedge faces of the shoes.

4. In a friction shock absorbing mechanism, the combination with a friction shell having curved friction surfaces on the interior thereof; of a spring resistance; friction shoes cooperable with the shell, each shoe having wedge faces extending along the edges thereof, the wedge faces of the adjacent edges of two shoes converging radially outwardly of the shell; a pressure-transmitting wedge block; a secondary wedge interposed between the wedge block and each pair of adjacent edge wedge faces of two shoes, each secondary wedge having wedge faces cooperable with the edge wedge faces of the shoes; and abutment means on said shoes coacting with said secondary wedges to prevent movement of the latter longitudinally of said shoes during a compression stroke.

5. In a friction shock absorbing mechanism, the combination with a shell having cylindric interior friction surfaces converged inwardly of the shell; of a spring resistance; a circularly arranged series of friction shoes cooperable with the shell, said shoes having longitudinally extending edge wedge faces and front and rear shoulders at the ends of said wedge faces on the inner end thereof; and a plurality of secondary wedges, corresponding in number to the shoes, each secondary wedge having a blunt angle wedge face cooperable with a wedge face of the wedge block and radially outwardly converged wedge faces cooperable with a pair of adjacent edge wedge faces of two shoes, said block being seated on the shoes between said front and rear shoulders thereof.

In witness that I claim the foregoing I have hereunto subscribed my name this 10th day of October 1922.

JOHN F. O'CONNOR.

Witnesses:
UNA C. GRIGSBY,
ANN BAKER.